United States Patent
Ohtsubo

(10) Patent No.: US 7,244,406 B2
(45) Date of Patent: Jul. 17, 2007

(54) METHOD FOR PRODUCING CUBIC BORON NITRIDE

(75) Inventor: Hirohiko Ohtsubo, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 305 days.

(21) Appl. No.: 10/505,664

(22) PCT Filed: Feb. 28, 2003

(86) PCT No.: PCT/JP03/02364

§ 371 (c)(1), (2), (4) Date: Aug. 25, 2004

(87) PCT Pub. No.: WO03/072495

PCT Pub. Date: Sep. 4, 2003

(65) Prior Publication Data

US 2005/0220690 A1    Oct. 6, 2005

Related U.S. Application Data

(60) Provisional application No. 60/361,326, filed on Mar. 5, 2002.

(30) Foreign Application Priority Data

Feb. 28, 2002  (JP) .............................. 2002-054374

(51) Int. Cl.
 *C01B 21/064* (2006.01)
 *B03D 1/06* (2006.01)
(52) U.S. Cl. ..................................... 423/290; 209/164
(58) Field of Classification Search ............... 423/290; 209/164
See application file for complete search history.

(56) References Cited

U.S. PATENT DOCUMENTS

| | | | |
|---|---|---|---|
| 2,947,617 A | 8/1960 | Wentorf, Jr. et al. | |
| 3,661,521 A | 5/1972 | Birle | |
| 5,618,509 A | 4/1997 | Shioi et al. | |
| 5,837,214 A * | 11/1998 | Shioi et al. | 423/290 |
| 6,508,996 B2 * | 1/2003 | Shioi et al. | 423/290 |
| 7,014,826 B2 * | 3/2006 | Iizuka | 423/290 |

FOREIGN PATENT DOCUMENTS

| | | |
|---|---|---|
| JP | 49-27757 B | 7/1974 |
| JP | 51-6199 A | 1/1976 |
| JP | 58-084106 A | 5/1983 |
| JP | 7-68153 A | 3/1995 |
| JP | 9-910 A | 1/1997 |

OTHER PUBLICATIONS

International Search Report, dated Jun. 24, 2003.
PCT Rule 66 Written Opinion, PCT/IPEA/408, no date.

* cited by examiner

*Primary Examiner*—Wayne A. Langel
(74) *Attorney, Agent, or Firm*—Sughrue Mion, PLLC

(57) ABSTRACT

A method is provided for producing cubic boron nitride, in which a mixture containing hexagonal boron nitride and a catalyst is maintained under pressure and temperature conditions that thermodynamically favor the stable presence of cubic boron nitride, thereby forming composite lumps containing cubic boron nitride, which in turn are dissolved in an alkaline solution to recover cubic boron nitride. The method is characterized by including, prior to the dissolving step, a step of decreasing the ratio of low-pressure phase boron nitride to cubic boron nitride in the composite lumps down to 50% by mass or less.

13 Claims, 1 Drawing Sheet

METHOD FOR PRODUCING CUBIC BORON NITRIDE

CROSS-REFERENCE TO RELATED APPLICATION

This application claims the benefit pursuant to 35 U.S.C. § 119(e)(1) of U.S. Provisional Application No. 60/361,326 filed Mar. 5, 2002.

TECHNICAL FIELD

The present invention relates to a method for producing cubic boron nitride (cBN) by a high-pressure technique and, more particularly, to a method for separating and recovering cBN from composite lumps of cBN-containing material produced by a high-pressure technique.

This application is based on Japanese Patent Application No. 2002-54374, the content of which is incorporated herein by reference.

BACKGROUND ART

Techniques for producing composite lumps containing cBN are disclosed in, for example, Japanese Examined Patent Application, First Publication No. Sho 58-84106 and U.S. Pat. No. 2,947,617 in which a mixture of hexagonal boron nitride (hBN) and a catalyst is placed under pressure and temperature conditions that thermodynamically favor the stable presence of cBN.

Specifically, powder of hBN is mixed with a catalyst provided in the form of powder or lumps of an alkaline metal, an alkaline earth metal or a compound containing these elements. The resulting material is packed in a heater mainly made of graphite. The heater is then inserted in a capsule made of pyrophyllite. The material is then maintained under pressure and temperature conditions that thermodynamically favor the stable presence of cBN to produce composite lumps of cBN-containing material.

The cBN-containing composite lumps produced in this manner contain, aside from cBN, materials such as low-pressure phase boron nitride (i.e., remaining unreacted hBN, pBN, rBN, and recrystallized hBN), catalysts, graphite materials, and pyrophyllite. Thus, to produce cBN, cBN alone must be separated and recovered from the composite lumps.

Conventionally, the following method has been employed to separate and recover only cBN from the composite lumps.

The catalysts present in the composite lumps generally dissolve in water and thus can be separated by subjecting the crushed composite lumps to a process known as decantation. In this process, water is added to a mixture containing a substance of interest. After stirring, the solution is allowed to stand still to cause the substance to settle, and the supernatant is decanted. This process may be repeated more than one time.

The low-pressure phase boron nitride, pyrophyllite, and cBN contained in the composite lumps can be separated in a manner as described in, for example, Japanese Examined Patent Application, Second Publication No. Sho 49-27757. In this technique, composite lumps are crushed down to 5 mm or smaller in size. Sodium hydroxide is added to the crushed material along with a small amount of water, and the mixture is heated at about 300° C. to dissolve the low-pressure phase boron nitride in the sodium hydroxide solution.

The graphite material present in the composite lumps is separated and removed by dissolving the graphite in a mixture of sulfuric acid and nitric acid. Pyrophyllite, most of which in many cases exists as large chunks, may be removed manually by using tweezers or other tools.

As described above, the conventional technique for separating and recovering cBN from the composite lumps involves the use of large amounts of strongly acidic or strongly basic reagents in order to remove the low-pressure phase boron nitride, pyrophyllite, and graphite material and is therefore associated with considerable operational risks. The technique also requires significant amounts of labor and costly facilities to neutralize and properly process waste water. In particular, strongly basic reagents are used in substantial amounts and thus add to the operational risks and the amount of labor devoted to neutralizing the waste water. A further drawback is that the remaining low-pressure phase boron nitride in the composite lumps cannot be recycled because the low-pressure phase boron nitride is dissolved and discarded.

DISCLOSURE OF INVENTION

Through the course of extensive studies to solve the aforementioned problems, the present inventors have found that, by using the following methods of the present invention, the amount of strongly basic reagents used to separate and recover cBN from the composite lumps produced by the high-pressure process can be minimized and the operational risks as well as the amount of labor required in neutralizing waste water can be reduced, while the method maximizes the amount of the residual low-pressure phase boron nitride that can be recycled. The finding ultimately led the present inventors to complete the present invention, which principally concerns the following aspects.

(1) A method for producing cubic boron nitride, in which a mixture containing hexagonal boron nitride and a catalyst is maintained under pressure and temperature conditions that thermodynamically favor the stable presence of cubic boron nitride, thereby forming composite lumps containing cubic boron nitride, which in turn are dissolved in an alkaline solution to recover cubic boron nitride, the method being characterized by including, prior to the dissolving step, a step of decreasing the ratio of low-pressure phase boron nitride to cubic boron nitride in the composite lumps down to 50% by mass or less.

(2) The method for producing cubic boron nitride according to (1) above, characterized in that the ratio of low-pressure phase boron nitride to cubic boron nitride in the composite lumps is reduced to 30% by mass or less.

(3) The method for producing cubic boron nitride according to (1) or (2) above, characterized in that the step of reducing the ratio of low-pressure boron nitride to cubic boron nitride in the composite lumps is carried out by ore floatation.

(4) The method for producing cubic boron nitride according to (3) above, characterized in that, prior to the ore floatation process, the composite lumps are crushed down to an average particle size of 20 mm or less.

(5) The method for producing cubic boron nitride according to (3) above, characterized in that, prior to the ore floatation process, the composite lumps are crushed down to an average particle size of 5 mm or less.

(6) The method for producing cubic boron nitride according to any one of (3) to (5) above, characterized in that the composite lumps are crushed and an ore floatation agent is added to the crushed product along with water, followed by stirring of the mixture and then the ore floatation process.

(7) The method for producing cubic boron nitride according to (6), characterized in that the water is hot water.

(8) The method for producing cubic boron nitride according to (6) or (7) above, characterized in that the ore floatation agent comprises at least one selected from kerosene, coal tar creosote, and sodium oleate, and at least one selected from pine oil, camphor, methylisobutyl carbinol (MIBC), conifer oil, cresylic acid, creosote oil, eucalyptus oil, and flotol oil.

(9) The method for producing cubic boron nitride according to (6) or (7) above, characterized in that, prior to the ore floatation step, the composite lumps are formed into a slurry with a solvent, to which an acid is added to adjust the pH to 1 or lower, and subsequently, the ore floatation agent is added to carry out the ore floatation process, the ore floatation agent comprising at least one selected from fatty acids, resin acids, and alkaline salts thereof, and at least one selected from pine oil, camphor, methylisobutyl carbinol (MIBC), conifer oil, cresylic acid, creosote oil, eucalyptus oil, and flotol oil.

(10) The method for producing cubic boron nitride according to (9) above, characterized in that water is used as a solvent for forming the composite lumps into the slurry.

(11) The method for producing cubic boron nitride according to (9) or (10) above, characterized in that hot water is used as a solvent for forming the composite lumps into the slurry.

(12) The method for producing cubic boron nitride according to any one of (9) to (11) above, characterized in that, subsequent to the addition of the acid to adjust the pH to 1 or lower, the slurry is allowed to stand causing the composite material to settle and the supernatant is removed, which is followed by another addition of acid to adjust the pH to 1 or lower and then by the ore floatation process.

BEST MODE FOR CARRYING OUT THE INVENTION

Figure 1:
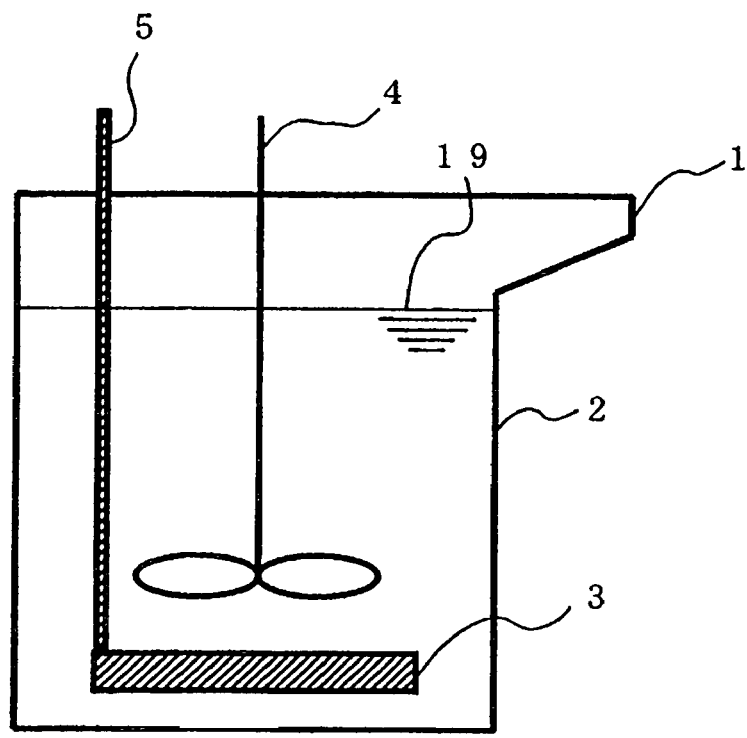
FIG. 1 is a schematic diagram showing an ore floatation apparatus in accordance with the present invention.

The method for producing cBN in accordance with the present invention includes the steps of producing composite lumps of cBN-containing material by placing a mixture containing hBN and a catalyst under pressure and temperature conditions that thermodynamically favor the stable presence of cBN, and recovering cBN therefrom by dissolving the composite lumps in an alkaline solution or an alkaline melt. The method is characterized by including, before the dissolving step, the step of decreasing the ratio of the low-pressure phase boron nitride to cBN in the composite lumps to 50% by mass or less.

Although hBN, the starting material in the method of the present invention, may be obtained commercially, it is preferable to use hBN containing less oxygen since oxide impurities such as boron oxide can slow down the conversion of hBN to cBN. To this end, an hBN powder containing 1% or less oxygen is preferably used. It is also preferable to use hBN having a particle size of 100 μm or less since too large a particle size can reduce the reactivity of hBN toward the catalyst materials, resulting in a decreased conversion rate into cBN.

The catalyst for catalyzing the conversion of hBN to cBN may be any known catalyst used for this purpose, including alkali metals (e.g., Li), nitrides (e.g., $Li_3N$) and boronitrides thereof ($Li_3BN_2$); alkali earth metals (e.g., Ca, Mg, Sr, and Ba), nitrides (e.g., $Ca_3N_2$, $Mg_3N_2$, $Sr_3N_2$, and $Ba_3N_2$) and boronitrides thereof (e.g., $Ca_3B_2N_4$, $Mg_3B2N4$, $Sr3B2N4$, $Ba3B2N$); and compound boronitrides of alkali metals and alkali earth metals (e.g., $LiCaBN2$ and $LiBaBN2$). Though the catalyst may have any particle size, it preferably has a particle size of 150 mesh (100 μm) or less since too large a particle size may result in a reduced reactivity toward hBN.

Preferably, the catalytic material is blended with hBN at a proportion of 5 to 50 parts by mass with respect to 100 parts by mass of hBN.

While the catalytic material and hBN may be made to coexist by mixing powders of respective materials, layers of hBN and the catalytic material may be alternately stacked on top of one another in a reactor.

In practice, hBN and the catalytic material, either as a mixture or individually, are shaped by pressing at a pressure of 1 to 2 tons/cm$^2$ ($9.8 \times 10^7$ Pa to $19.6 \times 10^7$ Pa) before packed in a reactor. In this manner, the powder material not only becomes more handleable but also shrinks to a lesser degree in a reactor, thereby improving the productivity of the cBN abrasive grains.

According to the present invention, cBN may be added beforehand to the shaped body or the stack of the catalytic material and hBN so that it can serve as seed crystals or nuclei to promote the growth of crystals of cBN. In such a case, the catalytic material may be coated onto the surface of the cBN seed crystals.

The shaped body of the catalytic material and hBN are packed in a reactor, which in turn is mounted on a known apparatus to generate high heat and high pressure and is maintained under temperature and pressure conditions that thermodynamically favor the stable presence of cBN. This thermodynamically stable region is described by O. Fukunaga (*Diamond Relat. Mater.*, 9 (2000) 7-12) and is typically in the pressure range of about 4 GPa to about 6 GPa and in the temperature range of about 1400° C. to about 1600° C. The reactor is maintained under these conditions for a time period of about 1 second to about 6 hours.

When maintained in the thermodynamically stable region of cBN, hBN is converted to cBN and, as a result, composite lumps typically made of hBN, cBN, catalytic materials and other substances are formed.

In general, the composite lumps produced by the above-described method are crushed and are dissolved in a heated strongly basic solution. The solution is then allowed to cool down and the lumps are washed with acid and are filtered to recover abrasive grains of cubic boron nitride. In the present invention, the ratio of the low-pressure phase boron nitride to cBN in the composite lumps is decreased to 50% by mass or less, preferably to 30% by mass or less, before the dissolving process. The ratio of the low-pressure phase boron nitride to cBN in the composite lumps is preferably made as small as possible.

In the present invention, the ratio of the low-pressure phase boron nitride to cBN in the composite lumps is determined by the following procedures:

(1) Crush composite lumps to an average size of 20 mm or less.

(2) Remove pyrophyllites in the pressure member with a pincette.

(3) Mix 150 g of the crushed powder with 1000 cc water, and boil the mixture for 180 minutes while stirring. In this step, catalysts mainly dissolve in water.

(4) Separate undissolved material. Wash and then dry the material. To 100 g of the material, add 200 g sodium hydroxide and 20 g water. Heat the mixture at 300° C. for 60 minutes while stirring. In this step, low-pressure phase boron nitride mainly dissolves in the solution.

(5) Separate undissolved material. After drying, add the material to a mixture of 500 g sulfuric acid and 150 g nitric acid. Heat the mixture for 90 minutes. In this step, graphite mainly dissolves in the solution.

(6) Separate, wash, dry, and then weigh the undissolved material. Since the weighed product consists of cBN and the weight of the low-pressure phase boron nitride is given by the decrease in weight in the dissolving process in step (4), the ratio of the low-pressure phase boron nitride to cBN in the composite lumps can be determined.

Any of known chemical and physical separation techniques may be used to decrease the ratio of the low-pressure phase boron nitride to cBN in the composite lumps to 50% by mass or less. Specific examples of the separation technique are specific gravity separation, dry ore floatation, and wet ore floatation. An exemplary dry ore floatation technique makes use of air stream, while wet ore floatation techniques are known which take advantage of bubbles, surface tension, or bulk oil. In the present invention, specific gravity separation and bubble ore floatation techniques are preferably used.

A typical specific gravity separation technique is performed as follows: since hBN, the principal low-pressure phase boron nitride in the composite lumps, has a specific gravity of 2.34 (as measured in $g/cm^3$; the same units are used hereinafter) and cBN has a specific gravity of 3.48, a heavy liquid with a specific gravity between 2.34 and 3.48 can be used as a medium for specific gravity separation. Methylene bromide (specific gravity=2.49), thallium formate, or thallium malonate may be used as the specific gravity separation medium.

A typical bubble ore floatation technique is performed as follows:

First, composite lumps are crushed down to an average size of 20 mm or less, preferably to an average size of 5 mm or less. Care must be taken not to crush the composite lumps to excessively small sizes as this may crush cBN. Subsequently, the crushed composite lumps are formed into a slurry in which cBN and the low-pressure phase boron nitride independently coexist to permit separation by ore floatation. To that end, the crushed lumps and water are placed, for example, in a stainless steel vessel along with a disperser operable in an alkaline environment, and the mixture is stirred. In doing so, hot water may be used rather than water or the mixture may be heated during stirring so as to improve separation by ore floatation. Preferably, the hot water has a temperature from 50° C. to 110° C. Also, ammonium gas generated during stirring needs to be exhausted to a scrubber or the like to ensure a safe operational environment.

Operators are required to be equipped with proper protective means such as alkali-resistant gloves and goggles to provide the necessary protection against the strongly basic slurry. Furthermore, it is recommended that stirring be terminated once cBN has been separated from the low-pressure phase boron nitride. If stirring is further continued, the slurry tends to become more homogenous and the low-pressure phase boron nitride completely crumbles into fine particles, resulting in the formation of a bulky froth (surfacing bubbles) during the floatation process. As a result, the operability of the slurry is decreased.

Upon formation of the slurry, the stirrer is stopped and the slurry is allowed to settle. This leaves an hBN layer formed on top of the sediment layer. Since this layer contains little cBN, it may be collected in advance with a vacuum hose so that the underlying layer containing some cBN can be first subjected to the ore floatation process.

The bottommost layer, composed mostly of cBN, may be directly subjected to the subsequent alkaline dissolution process.

First, the case in which the low-pressure phase boron nitride is caused to float by the ore floatation process to separate cBN from the low-pressure phase boron nitride will be described.

A collector capable of causing the low-pressure boron nitrides to attach to the bubbles, along with a bubbling agent to facilitate the formation of bubbles, is added to the slurry formed from the composite lumps, and the mixture is stirred. To this end, the concentration of the slurry is adjusted to 30% by mass or less. Concentrations of the slurry higher than 30% by mass can result in insufficient separation of cBN from the low-pressure phase boron nitride.

Also, it is preferable to provide means to prevent generation of eddies, such as a disturbance plate (or stabilizer) in the vessel, since such eddies, if significant, can result in insufficient separation of cBN from the low-pressure phase boron nitride.

Preferably, the collector suitable for use in the present invention is at least one selected from kerosene, coal tar creosote, and sodium oleate, and the bubbling agent is at least one selected from pine oil, camphor, methylisobutyl carbinol (MIBC: $(CH_3)_2CHCH_2CH(OH)CH_3$), conifer oil, cresylic acid, creosote oil, eucalyptus oil, and flotol oil.

Once the slurry has been thoroughly stirred to cause the collector to adsorb onto the surface of the low-pressure phase boron nitride, bubbles are introduced from below. Bubbles can be formed by any method that can generate the required amount of bubbles of a size suitable for the separation.

Typically, the low-pressure phase boron nitride is first roughly separated by ore floatation when the concentration of the slurry is high (30% by mass or higher), and the remaining slurry with a reduced concentration (10% by mass or lower) is again subjected to ore floatation for further separation. In this manner, hBN attached to the froth can be separated efficiently.

To that end, it is preferred that the separation be repeated in the same vessel or the separation be sequentially performed in an apparatus containing multiple tanks to improve the recovery of cBN.

It is also preferable to add additional collector, bubbling agent, or hot water during the separation process depending on the conditions of the ore floatation.

After the low-pressure phase boron nitride has been separated from the composite lumps by ore floatation, the residual cBN-rich composite material remaining at the bottom of the floatation apparatus is collected and the remaining low-pressure phase boron nitride is subjected to the subsequent dissolving process using reagents such as a strong alkali. Since the present invention makes it possible to significantly reduce the proportion of the low-pressure phase boron nitride present in the composite lumps, the amount of alkaline reagents used in the dissolving process can be significantly reduced.

Alternatively, cBN may be caused to float by the ore floatation process. For example, this is done by the following procedures:

As described above, composite lumps are first crushed down to an average size of 20 mm or less, preferably to an average size of 5 mm or less. The crushed composite lumps are then formed into a slurry in which cBN and the low-pressure phase boron nitride independently coexist to permit separation by ore floatation.

The pH of the slurry is then adjusted to a value of 1 or lower by the addition of an acid, and the slurry is subjected to the ore floatation process. Following the addition of the acid to adjust the pH to 1 or lower and prior to ore floatation, the slurry may be allowed to stand allowing the composite material to settle and the supernatant may be discarded, followed by another addition of an acid to adjust the pH back to 1 or lower. In this manner, the separation by ore floatation can be further improved.

Preferably, the collector to cause cBN to float along with bubbles is at least one selected from fatty acids, resin acids, and alkaline salts thereof, and the bubbling agent is at least one selected from pine oil, camphor, methylisobutyl carbinol (MIBC: $(CH_3)_2CHCH_2CH(OH)CH_3$), conifer oil, cresylic acid, creosote oil, eucalyptus oil, and flotol oil. Preferably, fatty acid is a fatty acid with 12 to 20 carbon atoms, including lauric acid, myristic acid, palmitic acid, stearic acid, oleic acid, linoleic acid, and linolenic acid.

The slurry obtained after ore floatation according to the present invention can be subjected to an ordinary alkaline dissolving process to recover cBN. Specifically, sodium hydroxide, along with a small amount of water, is added to the slurry resulting after ore floatation. The mixture is then heated to about 300° C. to selectively dissolve the low-pressure phase boron nitride and the like. After cooling, the mixture is washed with an acid and then with water, and is filtered to isolate cBN.

EXAMPLES

The present invention will now be described in detail with reference to the following examples, which are not intended to limit the scope of the invention in any way.

Example 1

To 100 parts by mass of hBN (UHP-1 manufactured by SHOWA DENKO K.K; average particle size =8 to 10 μm purity=98%), 15 parts by mass of $LiCaBN_2$, a catalyst needed for cBN synthesis, and 0.5 parts by mass of cBN grains to serve as seed crystals were added and the mixture was shaped to yield a sample. The shaped sample had a density of 1.92 g/cm³. The shaped sample was packed in a reactor, which in turn was loaded onto an apparatus to generate high heat and high pressure, and the sample was maintained at 5 Gpa at 1500° C. for 15 minutes to carry out the synthesis. Upon completion of the synthesis, the resulting composite lumps were taken out from the apparatus and were crushed down to an average particle size of 5 mm.

The composition of the crushed mixture was as follows: 40% by mass of hBN; 41% by mass of cBN; 15% by mass of catalysts; and 4% by mass of graphite and pyrophyllite. The ratio of the mass of the low-pressure phase boron nitride to the mass of cBN was 98%.

To 15 kg of the crushed grains, 1 L of a solution of a disperser (poiz 530 manufactured by KAO Co., Ltd.), diluted 3-fold with water, was added along with hot water to give a final volume of 60 L. While being maintained at about 90° C., the mixture was stirred for 900 minutes to form a slurry.

The resulting slurry was subjected to the ore floatation process. The ore floatation apparatus used is schematically depicted in FIG. 1. The ore floatation apparatus includes a stainless steel vessel 2, which is 60 cm high and 47 cm in inner diameter, has an effective volume of 70 L, and includes a beak 1. Arranged at the bottom of the vessel 2 are a pair of air diffuser pipes 3 (Model M-58, DAICEN MEMBRANE SYSTEMS Co., LTD.) for generating air bubbles. The pair of diffuser pipes 3 are made from polymethylmethacrylate and include holes with a diameter of 50 μm. A 100 W variable stirrer 4 is also placed in the vessel 2. The pair of air diffuser pipes 3 are connected via a pipe 5 to a 110 W pump so that the pipes 3 can each send air at a gauge pressure of 3 kg/cm² (relative pressure $=2.94 \times 10^5$ Pa) and at a flow rate of 70 L/min.

The slurry had a pH of 11.4g of sodium oleate were added to the slurry and the mixture was stirred for 5 minutes. This was followed sequentially by the addition of 200 ml of kerosene, stirring for another 5 minutes, addition of another 4 g of sodium oleate, and stirring for another 5 minutes. Subsequently, air was sent into the mixture for about 1 hour to carry out ore floatation.

The floated froth (materials attached to bubbles and floated to the surface) weighed 4.7 kg, which consisted of 4.4 kg of hBN, 0.15 kg of cBN, and 0.15 kg of graphite and pyrophyllite.

The cBN-rich, residual tails (residual portion that did not attach to bubbles and remained in the vessel) remaining at the bottom of the vessel weighed 8.1 kg, which consisted of 1.6 kg hBN, 6.0 kg cBN, and 0.5 kg of graphite and pyrophyllite.

The proportion of the low-pressure phase boron nitride in the tails was 26% by mass with respect to the mass of cBN. Subsequently, 4 kg sodium hydroxide and 0.4 L water were added to the tails and the mixture was heated to 300° C. in a stainless steel vessel, which was followed by decantation with water 5 times. As a result, cBN completely free of hBN was collected.

In contrast to the conventional method which requires as much as 10 kg of sodium hydroxide in the alkaline dissolving process, the residual hBN can be decomposed, in accordance with the ore floatation process of the present invention, by using only 4 kg of sodium hydroxide, which is less than half as much as is required by the conventional process. Since the amount of residual hBN is reduced, less ammonium gas is emitted upon decomposition of hBN, and the solution of sodium hydroxide is kept from boiling over during the reaction. Not only does this allow more materials to be placed in the reactor, thereby leading to an increased productivity, but it also permits recycling of hBN separated by ore floatation.

Example 2

52 kg of a mixture, produced in the same manner as in Example 1 and crushed down to 5 mm or less in size (composed of 40% by mass of hBN, 41% by mass of cBN, 4% by mass of graphite and pyrophyllite, and 15% by mass of catalysts; the ratio of the mass of the low-pressure phase boron nitride to that of cBN is 98% by mass), was placed in a 200 L stainless steel vessel. 150 L hot water, along with 2 L of a solution of a disperser (poiz 530 manufactured by KAO Co., Ltd.), diluted 3-fold with water, was added to the mixture. While being maintained at about 90° C., the mixture was stirred for 900 minutes to form a slurry.

Subsequently, stirring was stopped and the slurry was allowed to settle. This left an hBN layer on top of the sediments. Since this layer contained little cBN, it was collected in advance with a vacuum hose and the underlying cBN-rich fraction was subjected to ore floatation.

The fraction separated using the vacuum hose weighed 7.3 kg, which consisted of 6.8 kg hBN and 0.5 kg of graphite and pyrophyllite.

Figure 2:
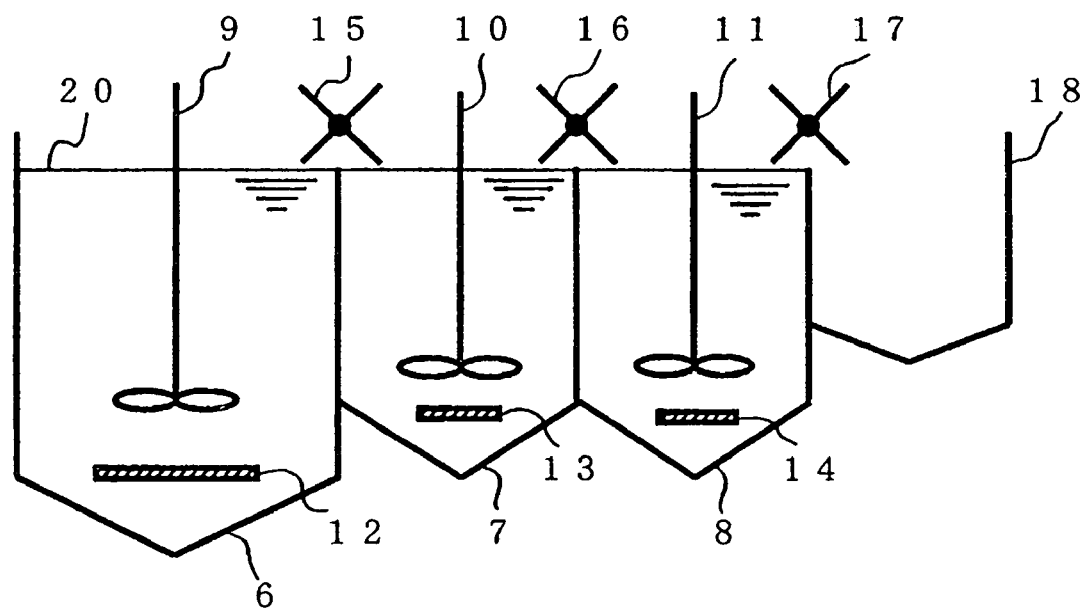
FIG. 2 is a schematic diagram showing an ore floatation apparatus in accordance with the present invention with three independent ore floatation reservoirs.

The remaining fraction excluding the bottommost layer composed mainly of cBN was loaded onto an ore floatation apparatus that included three individual ore floatation reservoirs. The ratio of the mass of low-pressure phase boron nitride to that of cBN in the slurry subjected to the ore floatation process was 95% by mass. The ore floatation apparatus used is schematically depicted in FIG. 2.

Specifically, the slurry was first transferred to a first ore floatation reservoir 6. 200 mL of kerosene to serve as a collector and 20 mL of MIBC to serve as a bubbling agent were added to the slurry and the mixture was stirred with a stirrer 9 for 5 minutes. Subsequently, bubbles were introduced by an air diffuser pipe 12 placed at the bottom of the reservoir to begin ore floatation. The resulting hBN-rich froth floating in the first ore floatation reservoir 6 was then transferred to a second ore floatation reservoir 7 by means of a rotary paddle 15 for the secondary ore floatation to collect cBN present in the froth. Similarly, the resulting froth was transferred to a third ore floatation reservoir 8 where it was subjected to further ore floatation to separate cBN present in the froth.

The froth weighed 10 kg, which consisted of 8.9 kg hBN, 0.04 kg cBN, and 1.06 kg graphite and pyrophyllite. The tail fractions collected from the bottom of the vessel used to form the slurry and from the bottoms of the three reservoirs for ore floatation together consisted of 21.1 kg cBN, 4.9 kg hBN, and 0.96 kg of graphite and pyrophyllite, with the ratio of the mass of low-pressure boron nitrides to that of cBN being 23% by mass. Sodium hydroxide and a small amount of water were added to the tail fraction, and the mixture was heated to about 300° C. and was then subjected to decantation with water 5 times. As a result, the residual hBN was completely removed. The method of the present invention made it possible to reduce the required amount of sodium hydroxide from 75 kg in the conventional technique down to 50 kg. Furthermore, dissolved sodium hydroxide was prevented from boiling over upon heating, ensuring the safety of the process.

Example 3

Composite lumps resulting from defective synthesis were crushed, and the composition of the crushed grains was determined as follows: 73% by mass of hBN; 4% by mass of cBN; 14% by mass of catalyst; and 9% by mass of graphite and pyrophyllite. The ratio of the mass of low-pressure phase boron nitride to that of cBN turned out to be 1825% by mass.

To 10 kg of the crushed product, 1 L of a solution of a disperser (poiz 530 manufactured by KAO Co., Ltd.) diluted 3-fold with water was added along with hot water to give a final volume of 60 L. The mixture was formed into a slurry in the same manner as in Example 1.

Prior to the ore floatation process, hydrochloric acid was added to the slurry to adjust the pH to a value of 1. This was followed by decantation with water 5 times and another addition of hydrochloric acid to adjust the pH to 1.

The slurry was then subjected to the ore floatation process using the ore floatation apparatus shown in FIG. 1. The slurry was placed in the vessel 2, followed by the addition of 3 g sodium dodecyl sulfate and a 5-minute stirring by the stirrer 4. Air was then introduced by the air diffuser pipes 3. Several minutes of bubbling caused most of cBN to float to the surface. The floating cBN was collected by a net. In this way, as much as 98% by mass of the cBN content was recovered. The ratio of the mass of the low-pressure phase boron nitride to that of cBN in the recovered product was 0.5% by mass.

INDUSTRIAL APPLICABILITY

The method for producing cubic boron nitride in accordance with the present invention facilitates the operation in separating cBN from cBN-containing composite lumps by a high-pressure technique and permits the production of cBN at a reduced cost. In particular, the method of the present invention permits a significant reduction in the amount of strongly basic reagents required by the process, thereby reducing operational risks and the amount of labor required in the neutralizing process. The method of the present invention also permits recycling of the low-pressure phase boron nitride remaining in the composite lumps.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

The invention claimed is:

1. A method for producing cubic boron nitride, in which a mixture containing hexagonal boron nitride and a catalyst is maintained under pressure and temperature conditions that thermodynamically favor the stable presence of cubic boron nitrlde, thereby forming composite lumps containing cubic boron nitride and low-pressure phase boron nitride, which in turn are dissolved in an alkaline solution to recover cubic boron nitride, the method comprising the step of
   decreasing the ratio of low-pressure phase boron nitride to cubic boron nitride in the composite lumps down to 50% by mass or less prior to dissolving the composite lumps in the alkaline solution.

2. The method for producing cubic boron nitride according to claim 1, wherein the ratio of low-pressure phase boron nitride to cubic boron nitride in the composite lumps is reduced to 30% by mass or less.

3. The method for producing cubic boron nitride according to claim 1 or 2, wherein the step of decreasing the ratio of low-pressure boron nitride to cubic boron nitride in the composite lumps is carried out by an ore floatation process.

4. The method for producing cubic boron nitride according to claim 3, further comprising the step of crushing the composite lumps down to an average particle size of 20 mm or less prior to the ore floatation process.

5. The method for producing cubic boron nitride according to claim 3, further comprising the step of crushing the composite lumps down to an average particle size of 5 mm or less prior to the ore floatation process.

6. The method for producing cubic boron nitride according to claim 3, further comprising the steps of:
   crushing the composite lumps;

adding an ore floatation agent to a resulting crushed product of the composite lumps along with water; and stirring a resulting mixture prior to the ore floatation process.

7. The method for producing cubic boron nitride according to claim 4, further comprising the steps of:

adding an ore floatation agent to a crushed product of the composite lumps along with water, and stirring a resulting mixture prior to the ore floatation process.

8. The method for producing cubic boron nitride according to claim 6, wherein the water is hot water.

9. The method for producing cubic boron nitride according to claim 6, wherein the ore floatation agent comprises at least one substance selected from the group consisting of kerosene, coal tar creosote, and sodium oleate, and at least one substance selected from the group consisting of pine oil, camphor, methylisobutyl carbinol (MIBO), conifer oil, cresylic acid, creosote oil, eucalyptus oil, and flotol oil.

10. The method for producing cubic boron nitride according to claim 6, further comprising the steps of:

dissolving the composite lumps in a solvent to form a slurry prior to the ore floatation process;

adding an acid to the slurry to adjust the pH of the slurry to 1 or lower, and subsequently adding the ore floatation agent to carry out The ore floatation process, the ore floatation agent comprising at least one substance selected from the group consisting of fatty acids, resin acids, and alkaline salts thereon and at least one substance selected from the group consisting of selected from pine oil, camphor, methylisobutyl carbinol (MIBC), conifer oil, cresylic acid, creosote oil, eucalyptus oil, and flotol oil.

11. The method for producing cubic boron nitride according to claim 10, wherein water is used as the solvent for forming the composite lumps into the sluny.

12. The method for producing cubic boron nitride according to claim 10, wherein hot water is used as the solvent for forming the composite lumps into the slurry.

13. The method for producing cubic boron nitride according to claim 10, further comprising the steps of:

subsequent to the addition of the acid to adjust the pH of the slurry to 1 or lower, allowing the slurry to stand causing a composite material to settle and removing the supernatant;

making another addition of acid to adjust the pH of the slurry to 1 or lower, and subsequently carrying out the ore floatation process.

* * * * *